United States Patent
Guo et al.

(10) Patent No.: US 12,104,647 B2
(45) Date of Patent: Oct. 1, 2024

(54) ANGULAR CONTACT SELF-ALIGNING ROLLER BEARING

(71) Applicant: Hongjun Guo, Wuxi (CN)

(72) Inventors: Hongjun Guo, Wuxi (CN); Kai Cheng, Wuxi (CN)

(73) Assignee: Hongjun Guo, Wuxi (CN)

( * ) Notice: Subject to any disclaimer, the term of this patent is extended or adjusted under 35 U.S.C. 154(b) by 201 days.

(21) Appl. No.: 17/771,768

(22) PCT Filed: Jan. 24, 2022

(86) PCT No.: PCT/CN2022/073359
§ 371 (c)(1),
(2) Date: Apr. 25, 2022

(87) PCT Pub. No.: WO2023/123587
PCT Pub. Date: Jul. 6, 2023

(65) Prior Publication Data
US 2023/0366431 A1 Nov. 16, 2023

(30) Foreign Application Priority Data
Dec. 28, 2021 (CN) .......................... 202111627471.1

(51) Int. Cl.
*F16C 33/58* (2006.01)
*F16C 19/36* (2006.01)
*F16C 23/08* (2006.01)

(52) U.S. Cl.
CPC ............ *F16C 33/585* (2013.01); *F16C 19/36* (2013.01); *F16C 23/086* (2013.01); *F16C 2240/76* (2013.01)

(58) Field of Classification Search
CPC .... F16C 23/084; F16C 23/086; F16C 23/088; F16C 33/585; F16C 2240/76
See application file for complete search history.

(56) References Cited

U.S. PATENT DOCUMENTS

| | | | | |
|---|---|---|---|---|
| 1,915,585 A | * | 6/1933 | Wincquist | F16C 33/543 384/571 |
| 2,008,336 A | * | 7/1935 | Palmgren | F16C 33/36 384/571 |
| 2,082,390 A | * | 6/1937 | Gibbons | F16C 23/086 29/898.063 |

FOREIGN PATENT DOCUMENTS

JP 2009008240 A * 1/2009

OTHER PUBLICATIONS

Machine Translation of JP-2009008240-A (Year: 2009).*

* cited by examiner

*Primary Examiner* — Alan B Waits
(74) *Attorney, Agent, or Firm* — Daylight Law, P.C.

(57) ABSTRACT

An angular contact self-aligning roller bearing, including rollers, an inner ring, a cage, an outer ring, an outer raceway and an inner raceway. The outer raceway is an inner spherical surface. A spherical center of the inner spherical surface is located on an axis of the outer ring and deviates from a central point of the outer ring. The rollers are in a single row. A working surface of each roller is an externally convex surface, which is formed by rotation of a first circular arc as a generatrix around an axis of each roller as a rotation axis. The inner raceway is an internally concave surface, which is formed by rotation of a second circular arc as a generatrix around an axis of the inner ring as a rotation axis. The bearing can withstand separate loads or combined loads in axial and radial directions, and adapt to misalignment.

8 Claims, 10 Drawing Sheets

ANGULAR CONTACT SELF-ALIGNING ROLLER BEARING

CROSS REFERENCE TO RELATED APPLICATION

This application is a 35 U.S.C. § 371 National Stage of International Application No. PCT/CN2022/073359, filed Jan. 24, 2022, which claims the benefit of and priority to Chinese Patent Application No. 202111627471.1 filed on Dec. 28, 2021, the disclosures of which are incorporated by reference herein in their entirety as part of the present application for all purposes.

TECHNICAL FIELD

The present disclosure relates to the technical field of radial rolling bearings, in particular to an angular contact self-aligning roller bearing.

BACKGROUND ART

According to the environment-friendly and energy-saving development requirements of the mechanical industry, the bearing must be light-weight design, namely, the bearing can withstand a larger load under the same boundary dimension or have a smaller dimension under the same load. Moreover, in most applications of the radial bearing, the combined load requirement for the bearing to withstand radial load as a major and axial load as a minor is further applied to the bearing. In addition, due to limitation of capacity and precision of machining equipment, there exists misalignment between a shaft where the bearings are fitted to and mounting holes of the bearings, and thus the bearing is required to have certain self-aligning performance. However, the bearings currently on the market cannot give consideration to the above issues.

Rolling elements of the existing deep groove ball bearings and angular contact ball bearings are steel balls, with small bearing load capacity in both radial and axial directions and low load density, are quite suitable for high-speed light-load condition, but under heavy-load condition, especially under the condition of limited mounting space, their bearing load capacity cannot meet the requirement.

Although cylindrical roller bearings and tapered roller bearings have large bearing load capacity, raceways and rollers are in straight-line contact, so that the cylindrical roller bearings and the tapered roller bearings are sensitive to relative tilting of inner rings and outer rings or the misalignment between the shaft where the bearings are fitted to and the mounting holes of the bearings (since stress concentration is easily caused at the two ends of the shaft, and stress values at the two ends thereof are far greater than the stress value in the middle), especially in the case of flexure of elongated shafts. Therefore, in occasions where the cylindrical roller bearings and the tapered roller bearings are used, the precision requirements for bearing seat holes and shafts are high.

Self-aligning roller bearings not only can bear large radial load, but also has a good self-aligning function. However, because the contact angle of the double-row self-aligning roller bearing is within 20°, the double-row self-aligning roller bearing can only withstand small axial loads, or only one row of rollers are loaded and thus the sliding of the other row of rollers for without enough force or torque moment is easily caused under the condition of unidirectional axial loads, resulting in premature bearing failure.

The single-row self-aligning roller bearing is called as drum-shaped roller bearing, and has a contact angle of 0°, so that the single-row self-aligning roller bearing mainly bears radial load, and the axial load capacity is very small.

Therefore, it is a technical problem to be urgently solved by persons skilled in the art how to provide a radial rolling bearing which not only can withstand separate loads or combined loads in axial and radial directions, but also can adapt to the misalignment between the shaft where the bearings are fitted to and the mounting holes of the bearings.

SUMMARY

The present disclosure aims to provide an angular contact self-aligning roller bearing which not only can withstand separated load or combined loads in axial and radial directions, but also can adapt to the misalignment between a shaft where the bearings are fitted to and the mounting holes of the bearings.

In order to achieve the purpose, the present disclosure provides the following solution.

According to the disclosure, an angular contact self-aligning roller bearing is disclosed. The angular contact self-aligning roller bearing includes rollers, an inner ring, a cage and an outer ring, wherein the inner ring, the cage and the outer ring are coaxially mounted, the cage is mounted between the inner ring and the outer ring, the cage is provided with pockets for the rollers to be mounted therein, the inner ring is provided with an inner raceway in rolling contact with the rollers, and the outer ring is provided with an outer raceway in rolling contact with the rollers.

The outer raceway is an inner spherical surface, a spherical center of the inner spherical surface is located on an axis of the outer ring and deviates from a central point of the outer ring; the rollers are in a single row, a working surface of each roller is an externally convex surface, which is formed by rotation of a first circular arc as a generatrix around an axis of said each roller as a rotation axis; the inner raceway is an internally concave surface, which is formed by rotation of a second circular arc as a generatrix around an axis of the inner ring as a rotation axis; a nominal contact angle of the outer raceway is defined as $\alpha$, a nominal contact angle of the inner raceway is defined as $\beta$, $0°<\alpha<45°$, and $0°<\beta<45°$; and a radius of the inner spherical surface is defined as SR, a radius of the first circular arc is defined as R1, a radius of the second circular arc is defined as R2, and $0.97SR \le R1 < SR$, $0.97 R2 \le R1 < R2$.

Preferably, an axial length of each roller is defined as L, a distance between a circle center of the first circular arc and an axial first end of said each roller is defined as L1, a distance between the circle center of the first circular arc and an axial second end of said each roller is defined as L2, and L1=L2=L/2; and a theoretical contact point of each roller and the outer raceway is defined as point A, a theoretical contact point of each roller and the inner raceway is defined as point B, a normal of the outer raceway at the point A passes through the point B, and a normal of the inner raceway at the point B passes through the point A.

Optionally, the inner ring is provided with a first end surface and a second end surface in the axial direction, and the outer ring is provided with a third end surface and a fourth end surface in the axial direction; the first end surface and the third end surface are coplanar, and the second end surface and the fourth end surface are coplanar.

Optionally, the inner ring is provided with a first end surface and a second end surface in the axial direction, and the outer ring is provided with a third end surface and a fourth end surface in the axial direction; the first end surface and the third end surface are coplanar, and the second end surface and the fourth end surface are not coplanar.

Preferably, an axial length of each roller is defined as L, a distance between a circle center of the first circular arc and an axial first end of said each roller is defined as L1, a distance between the circle center of the first circular arc and an axial second end of said each roller is defined as L2, and L1>L/2>L2; $\beta<\alpha$; a shoulder is arranged on the inner ring, and constrains and contacts with the axial second end of said each roller, so as to balance a resultant force of the forces applied to the rollers by the inner raceway and the outer raceway.

Optionally, the inner ring is provided with a first end surface and a second end surface in the axial direction, and the outer ring is provided with a third end surface and a fourth end surface in the axial direction; the first end surface and the third end surface are coplanar, and the second end surface and the fourth end surface are coplanar.

Optionally, the inner ring is provided with a first end surface and a second end surface in the axial direction, and the outer ring is provided with a third end surface and a fourth end surface in the axial direction; the first end surface and the third end surface are coplanar, and the second end surface and the fourth end surface are not coplanar.

Optionally, a surface where the axial second end of each roller is located is an outer spherical surface with a radius R3, and a spherical center of the outer spherical surface is located on the axis of said each roller.

Preferably, $\alpha \leq 30°$, $\beta \leq 30°$.

Preferably, SR=R2.

The present disclosure has the following advantageous technical effects over the prior art.

When the angular contact self-aligning roller bearing according to the disclosure is used, the inner ring, the cage and the rollers form an integral structure, and the integral structure can rotate along theoretical contact points of the rollers and the outer raceway, so that a self-aligning function is realized. Since the nominal contact angle of the inner raceway and the nominal contact angle of the outer raceway are both between 0° and 45°, forces applied to the rollers by the inner raceway and the outer raceway have component force in the axial direction and component force in the radial direction of the angular contact self-aligning roller bearing, and therefore the angular contact self-aligning roller bearing can withstand separated loads or combined loads in the axial and radial directions. Due to the fact that the rollers are in a single row, there is no problem that occurs in a double-row self-aligning roller bearing which fails due to single-sided stress when subject to unidirectional axial loads. As the radius SR of the inner spherical surface, the radius R1 of the first circular arc and the radius R2 of the second circular arc are very close to each other, when the angular contact self-aligning roller bearing is under heavy load, point contact between the rollers and the inner raceway and between the rollers and the outer raceway is converted into line contact due to slight deformation of contact areas, therefore improving the bearing load capacity.

BRIEF DESCRIPTION OF THE DRAWINGS

To more clearly illustrate embodiments of the present disclosure or technical solutions in the prior art, the following accompanying drawings for showing the embodiments will be briefly introduced. Apparently, the accompanying drawings to be discussed herein below show merely some embodiments of the present disclosure, and persons skilled in the art can still appreciate other modifications from these accompanying figures without creative efforts.

REFERENCE NUMERALS 100, outer ring; 110, outer raceway; 200, inner ring; 210, inner raceway; 300, roller; 310, working surface of roller; 320, end surface of roller; 400, cage;

Fa, axial force applied on outer ring; Fr, radial force applied on outer ring; A, theoretical contact point of roller and outer raceway; B, theoretical contact point of roller and inner raceway; C, axial length of inner ring; D, axial length of outer ring; $\alpha$, nominal contact angle of outer raceway; $\beta$, nominal contact angle of inner raceway; SR, radius of inner spherical surface; R1, radius of first circular arc; R2, radius of second circular arc; R3, radius of outer spherical surface.

DETAILED DESCRIPTION OF THE EMBODIMENTS

Embodiments of the present disclosure will be described below clearly and completely with reference to the accompanying drawings thereof. Apparently, the described embodiments are merely a part of the present disclosure rather than all of the embodiments thereof. Based on the embodiments discussed in the present disclosure, all other embodiments obtained by persons skilled in the art without creative efforts fall within the scope covered by the present disclosure.

The present disclosure aims to provide an angular contact self-aligning roller bearing which not only can withstand separated loads or combined loads in axial and radial directions, but also can adapt to the misalignment between the shaft where the bearings are fitted to and the mounting holes of the bearings.

The foregoing objects, features and advantages of the present disclosure will be more clearly understood from the following further detailed description taken in conjunction with the accompanying drawings.

Referring to FIG. 1 to FIG. 10, according to the embodiments, an angular contact self-aligning roller bearing is provided. The angular contact self-aligning roller bearing includes rollers 300, an inner ring 200, a cage 400 and an outer ring 100, and the inner ring 200, the cage 400 and the outer ring 100 are coaxially mounted. The cage 400 is installed between the inner ring 200 and the outer ring 100, and the cage 400 is provided with pockets for the rollers 300 to be mounted therein. The inner ring 200 is provided with an inner raceway 210 in rolling contact with the rollers 300, and the outer ring 100 is provided with an outer raceway 110 in rolling contact with the rollers 300.

The outer raceway 110 is an inner spherical surface, a spherical center of the inner spherical surface is located on an axis of the outer ring 100 and deviates from a central point of the outer ring 100, namely the inner spherical surface is an eccentric spherical surface. The rollers 300 are in a single row, namely, the multiple rollers 300 surround around the axis of the cage 400. A working surface 310 of each roller is an externally convex surface, which is formed by rotation of a first circular arc as a generatrix around an axis of the respective roller 300 as a rotation axis. The inner raceway 210 is an internally concave surface, which is formed by rotation of a second circular arc as a generatrix around an axis of the inner ring 200 as a rotation axis. A nominal contact angle of the outer raceway 110 is defined as $\alpha$, and further $\alpha$ is larger than $0°$ and smaller than $45°$, i.e., $0°<\alpha<45°$, and a nominal contact angle of the inner raceway 210 is defined as $\beta$, and $\beta$ is larger than $0°$ and smaller than $45°$, i.e., $0°<\beta<45°$. A radius of the inner spherical surface is defined as SR, a radius of the first circular arc is defined as R1, a radius of the second circular arc is defined as R2, R1 is larger than or equal to 0.97SR and smaller than SR, and R1 is larger than or equal to 0.97 R2 and smaller than R2, i.e. $0.97SR \leq R1 < SR$, $0.97\ R2 \leq R1 < R2$. It should be noted that the nominal contact angle mentioned above refers to the angle between a normal at the contact point with the roller 300 on the raceway and a radial plane of the bearing.

When the angular contact self-aligning roller bearing is used, the inner ring 200, the cage 400 and the rollers 300 form an integral structure, and the integral structure can rotate along theoretical contact points of the rollers 300 and the outer raceway 110, so as to realize a self-aligning function. Since the nominal contact angle of the inner raceway 210 and the nominal contact angle of the outer raceway 110 are both between $0°$ and $45°$, forces applied to the rollers 300 by the inner raceway 210 and the outer raceway 110 each have component force in the axial direction and component force in the radial direction of the angular contact self-aligning roller bearing, and therefore the angular contact self-aligning roller bearing can withstand separated loads or combined loads in the axial and radial directions. Due to the fact that the rollers 300 are a single row type, there is no problem that occurs in a double-row self-aligning roller bearing which fails due to single-sided stress when subject to unidirectional axial loads. As the radius SR of the inner spherical surface, the radius R1 of the first circular arc and the radius R2 of the second circular arc are very close to each other, when the angular contact self-aligning roller bearing is under heavy load, point contact between the rollers 300 and the inner raceway 210 and between the rollers 300 and the outer raceway 110 is converted into line contact due to slight deformation of contact areas, therefore improving the bearing load capacity. Through tests, it is found that the bearing load capacity of the angular contact self-aligning roller bearing is more than two times that of a deep groove ball bearing and an angular contact ball bearing with the same boundary dimensions, and the fatigue life of the angular contact self-aligning roller bearing is more than eight times that of the deep groove ball bearing and the angular contact ball bearing with the same boundary dimensions.

In most cases, $\alpha$ is smaller than or equal to $30°$, and $\beta$ is smaller than or equal to $30°$, i.e. $\alpha \leq 30°$, $\beta \leq 30°$. In a few cases of heavy load, $\alpha$ can be greater than $30°$, and $\beta$ can be greater than $30°$. The cage 400 can be made of copper, plastic, or other materials, which may be flexibly selected by persons skilled in the art without limitation as required. The radius SR of the inner spherical surface and the radius R2 of the second circular arc are preferably equal.

In addition to the above technical features, the present disclosure is further explained below in combination with a first embodiment and a second embodiment. In the first embodiment and the second embodiment, a theoretical contact point of the roller 300 and the outer raceway 110 is defined as point A, a theoretical contact point of the roller 300 and the inner raceway 210 is defined as point B. It should be noted that the "theoretical contact point" herein means a point contact in the ideal condition (the part is an absolutely rigid body), but in practice, the point contact may be converted into a line contact, such as in the case of heavy loads mentioned above.

Embodiment I

Referring to FIG. 1 to FIG. 4 and FIG. 9 to FIG. 10, as a preferable embodiment, the first embodiment of the present disclosure provides an angular contact self-aligning roller bearing. The first embodiment further has the following technical features.

An axial length of each roller 300 is defined as L, a distance between a circle center of the first circular arc and an axial first end of the respective roller 300 is defined as L1, a distance between the circle center of the first circular arc and an axial second end of the respective roller 300 is defined as L2, and L1 is equal to L2, and also equal to L/2, i.e. $L1=L2=L/2$. A normal of the outer raceway 110 at the point A passes through the point B, and a normal of the inner raceway 210 at the point B passes through the point A. Namely, $\alpha$ is equal to $\beta$, i.e. $\alpha=\beta$. The forces applied to each roller 300 by the inner raceway 210 and the outer raceway 110 are collinear and in opposite directions, and thus the two forces can counteract each other (ignoring gravity), so that there is no need to provide additional stop structures (such as a shoulder) to constrain the rollers 300, in which the end surfaces of the rollers 300 do not rub against the stop structure when the rollers 300 rotate. Therefore, under the condition of a high-speed, medium-load or heavy-load, and elongated shafts, the angular contact self-aligning roller bearing according to the embodiment has the advantages of higher rotating speed, smaller vibration, lower noise, longer service life and the like.

Figure 1:
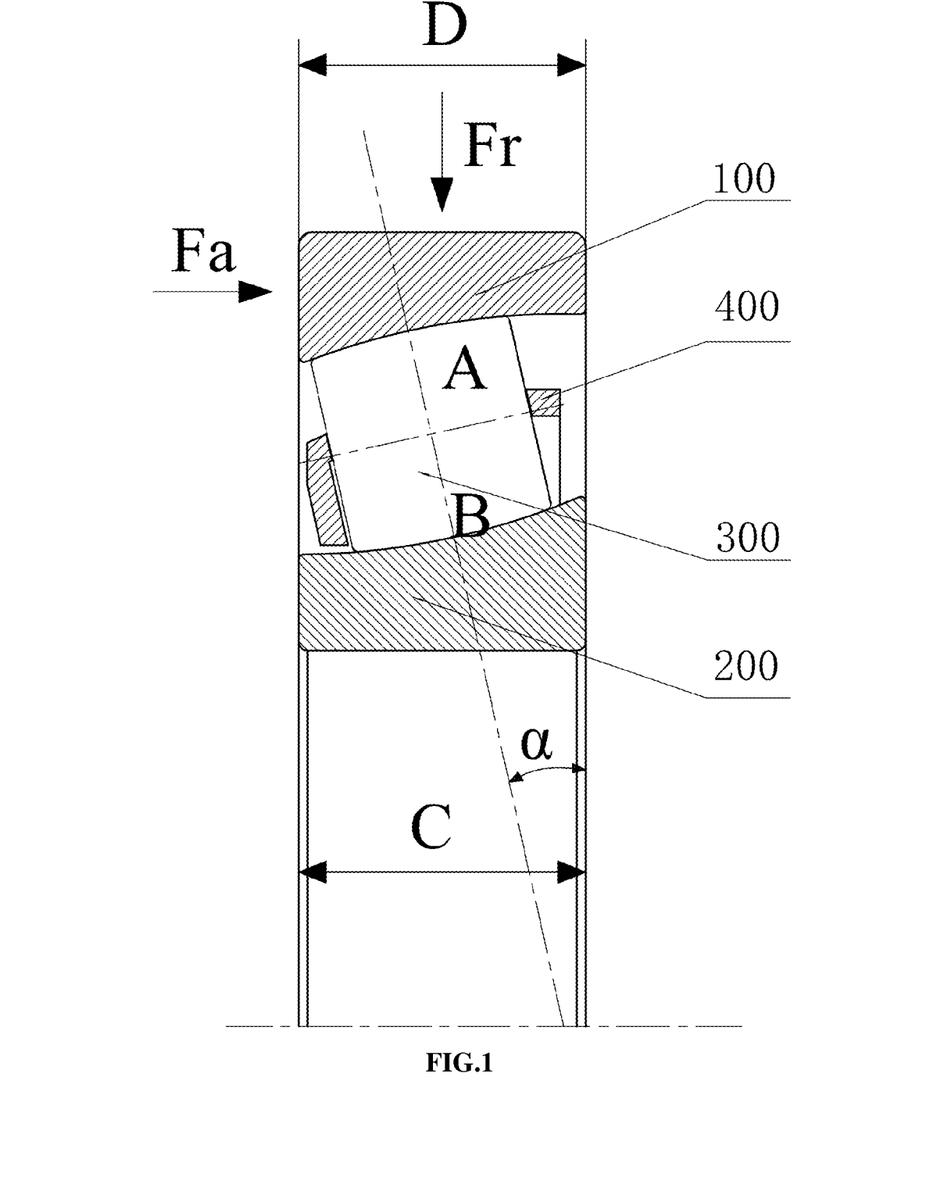
FIG. 1 is a schematic diagram of a first example of a first embodiment in the present disclosure.

Referring to FIG. 1, according to a first possible example of the first embodiment, the inner ring 200 is provided with a first end surface and a second end surface in the axial direction, and the outer ring 100 is provided with a third end surface and a fourth end surface in the axial direction; and the first end surface and the third end surface are coplanar, and the second end surface and the fourth end surface are coplanar. Namely, an axial length C of the inner ring 200 is equal to an axial length D of the outer ring 100. Under the condition of smooth load, the example can replace existing deep groove ball bearings and angular contact ball bearings with the same boundary dimensions.

Figure 2:
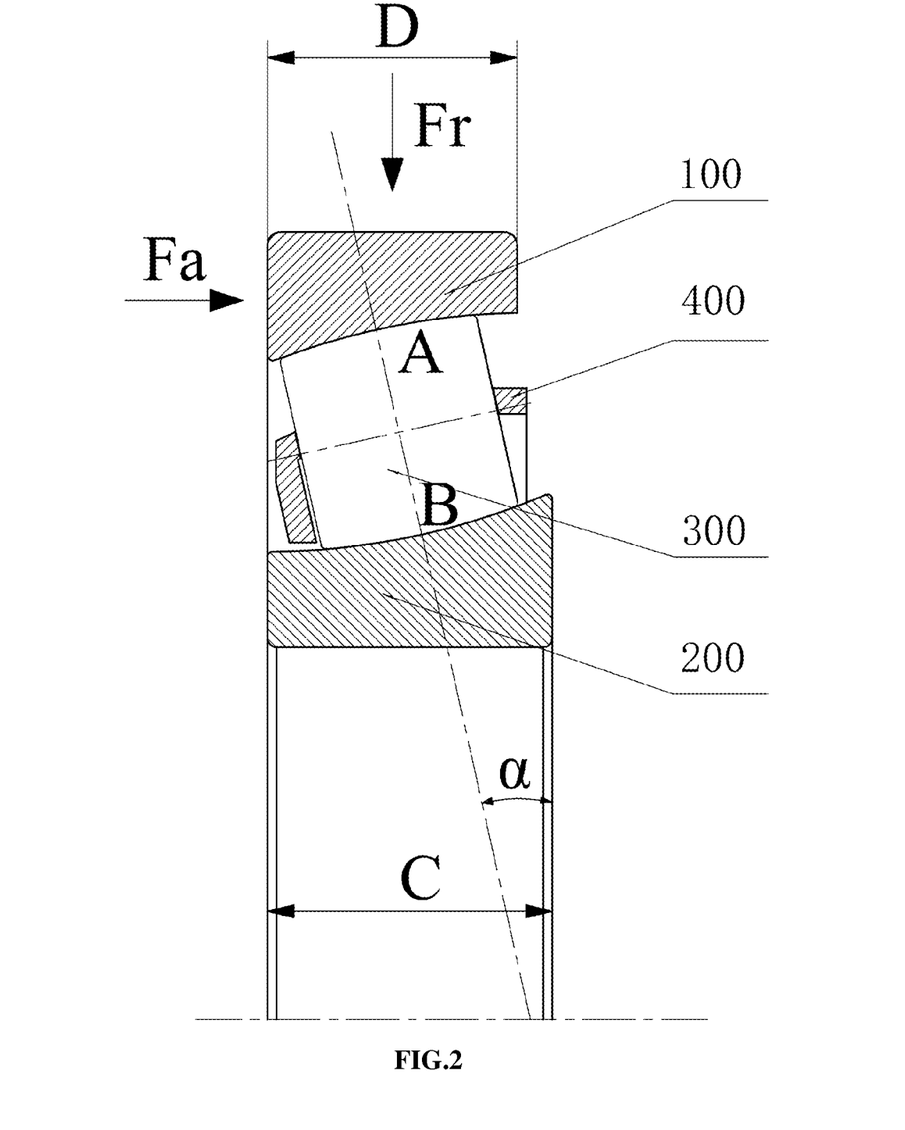
FIG. 2 is a schematic diagram of a second example of the first embodiment in the present disclosure.
Figure 3:
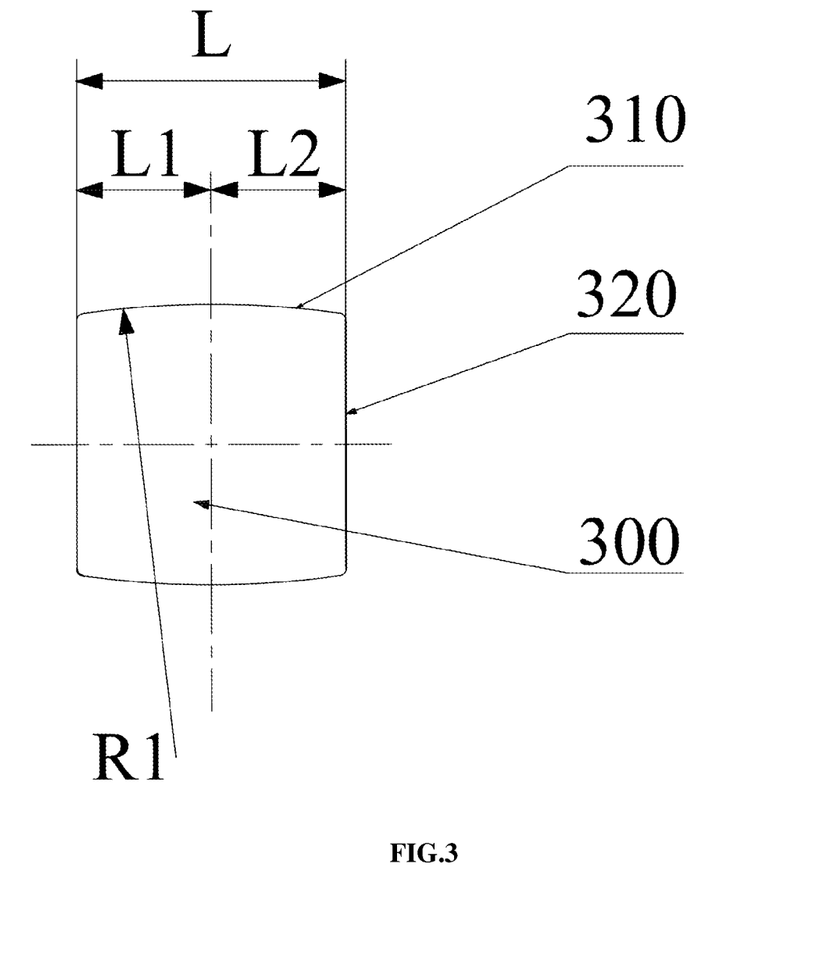
FIG. 3 is a schematic structural diagram of a roller of the first embodiment in the present disclosure.
Figure 4:
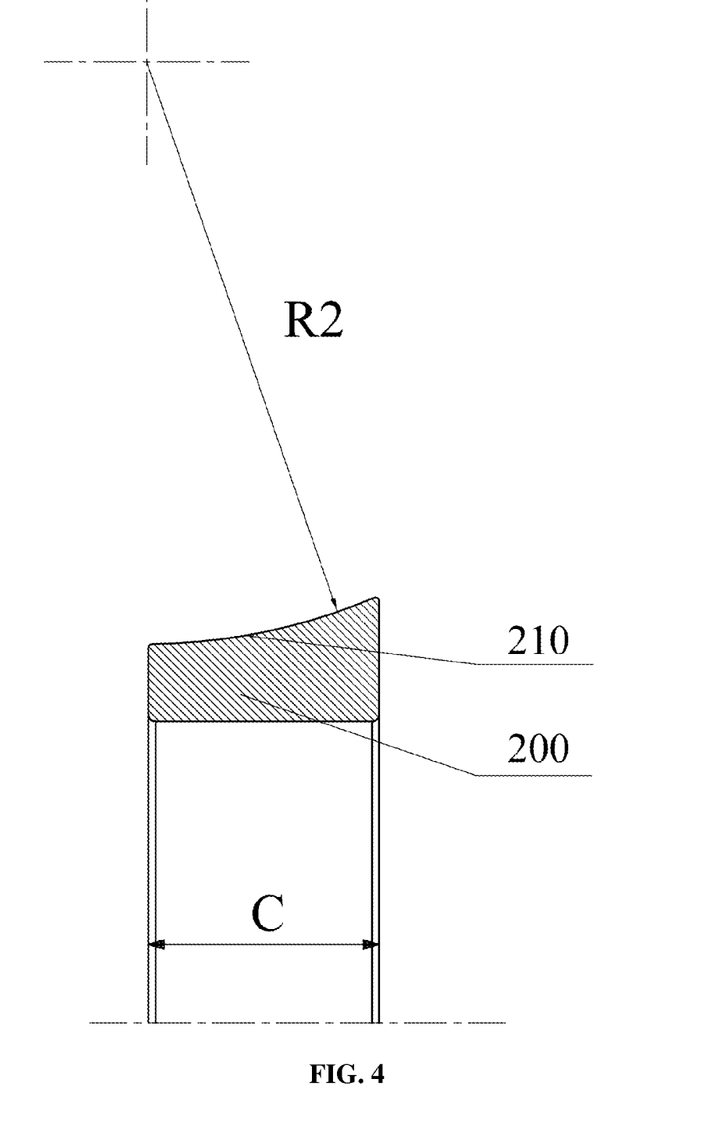
FIG. 4 is a schematic structural diagram of an inner ring of the first embodiment in the present disclosure.

Referring to FIG. 2, according to a second possible example of the first embodiment, the inner ring 200 is provided with a first end surface and a second end surface in the axial direction, and the outer ring 100 is provided with a third end surface and a fourth end surface in the axial direction; and the first end surface and the third end surface are coplanar, and the second end surface and the fourth end surface are not coplanar. Namely, an axial length C of the inner ring 200 is different from an axial length D of the outer ring 100. Under the condition of smooth load, the example can replace existing tapered roller bearings with the same boundary dimensions.

Embodiment II

Referring to FIG. 5 to FIG. 8 and FIG. 9 to FIG. 10, as a further preferable embodiment, the second embodiment of the present disclosure provides an angular contact self-aligning roller bearing. The second embodiment further has the following technical features.

The axial length of each roller 300 is defined as L, a distance between a circle center of the first circular arc and an axial first end of the respective roller 300 is defined as L1, a distance between the circle center of the first circular arc and an axial second end of the respective roller 300 is defined as L2, and L1 is larger than L/2, and L2 is smaller than L/2, i.e. L1>L/2>L2. $\beta$ is smaller than $\alpha$, i.e., $\beta<\alpha$. Namely, the forces applied to each roller 300 by the inner raceway 210 and the outer raceway 110 are not collinear, and cannot be counteracted each other (neglecting gravity). A shoulder is arranged on the inner ring 200, and constrains and contacts with the axial second end of each roller 300, so as to balance a resultant force of the forces applied to the rollers 300 by the inner raceway 210 and the outer raceway 110. When in use, the rollers 300 are always in contact with the shoulder and receive supporting force from the shoulder, so that the rollers 300 can still maintain smooth rotational posture without twisting under the conditions of impact load and non-stationary load.

Figure 5:
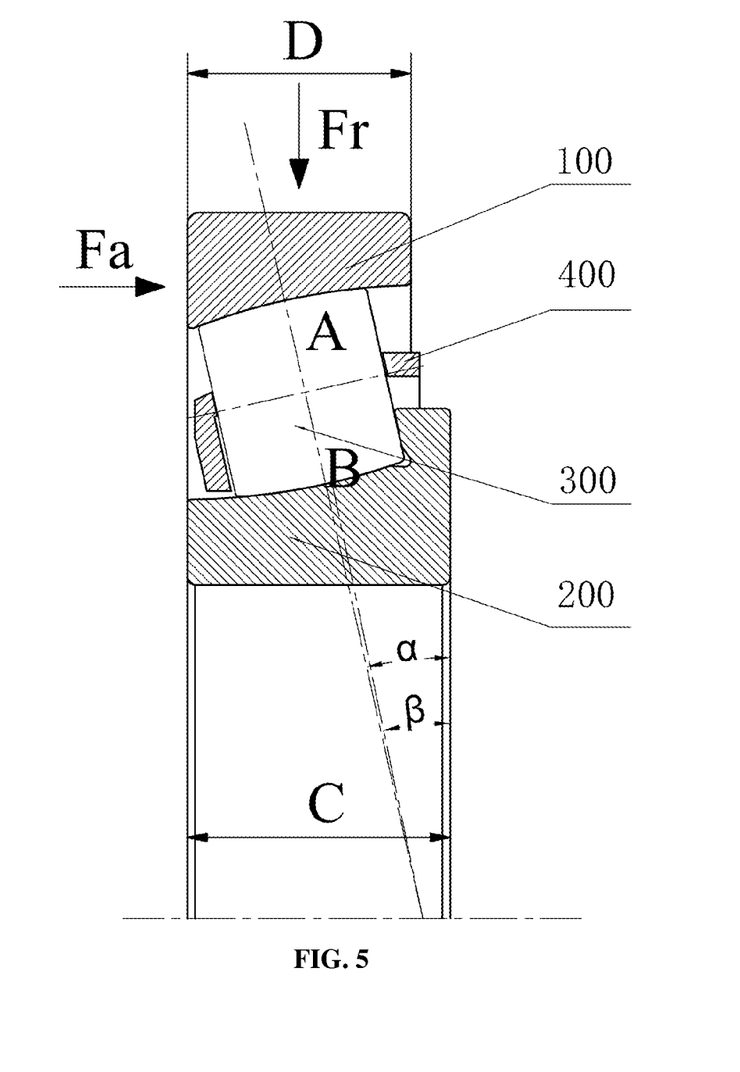
FIG. 5 is a schematic diagram of a first example of a second embodiment in the present disclosure.

Referring to FIG. 5, according to a first possible example of the second embodiment, the inner ring 200 is provided with a first end surface and a second end surface in the axial direction, and the outer ring 100 is provided with a third end surface and a fourth end surface in the axial direction; and the first end surface and the third end surface are coplanar, and the second end surface and the fourth end surface are coplanar. Namely, the axial length C of the inner ring 200 is equal to the axial length D of the outer ring 100. Under the conditions of impact load and non-stationary load, the example can replace existing deep groove ball bearings and angular contact ball bearings with the same boundary dimensions.

Figure 6:
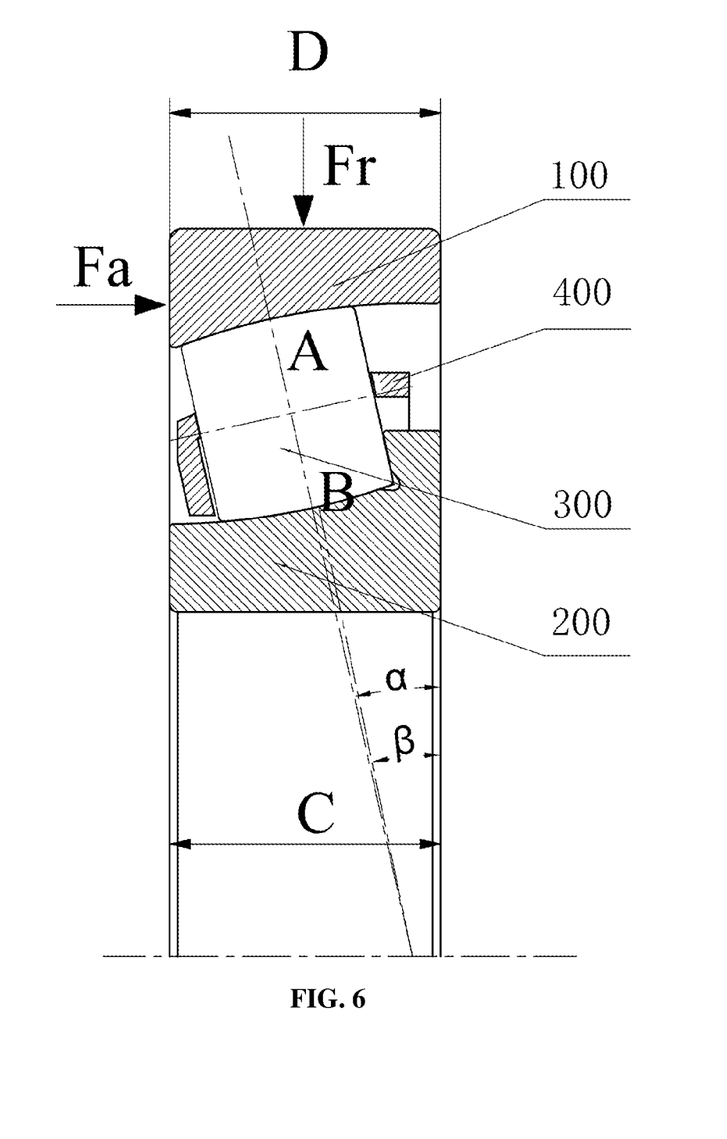
FIG. 6 is a schematic diagram of a second example of the second embodiment in the present disclosure.

Referring to FIG. 6, according to a second possible example of the second embodiment, the inner ring 200 is provided with a first end surface and a second end surface in the axial direction, and the outer ring 100 is provided with a third end surface and a fourth end surface in the axial direction; and the first end surface and the third end surface are coplanar, and the second end surface and the fourth end surface are not coplanar. Namely, an axial length C of the inner ring 200 is different from an axial length D of the outer ring 100. Under the conditions of impact load and non-stationary load, the example can replace existing tapered roller bearings with the same boundary dimensions.

Figure 7:
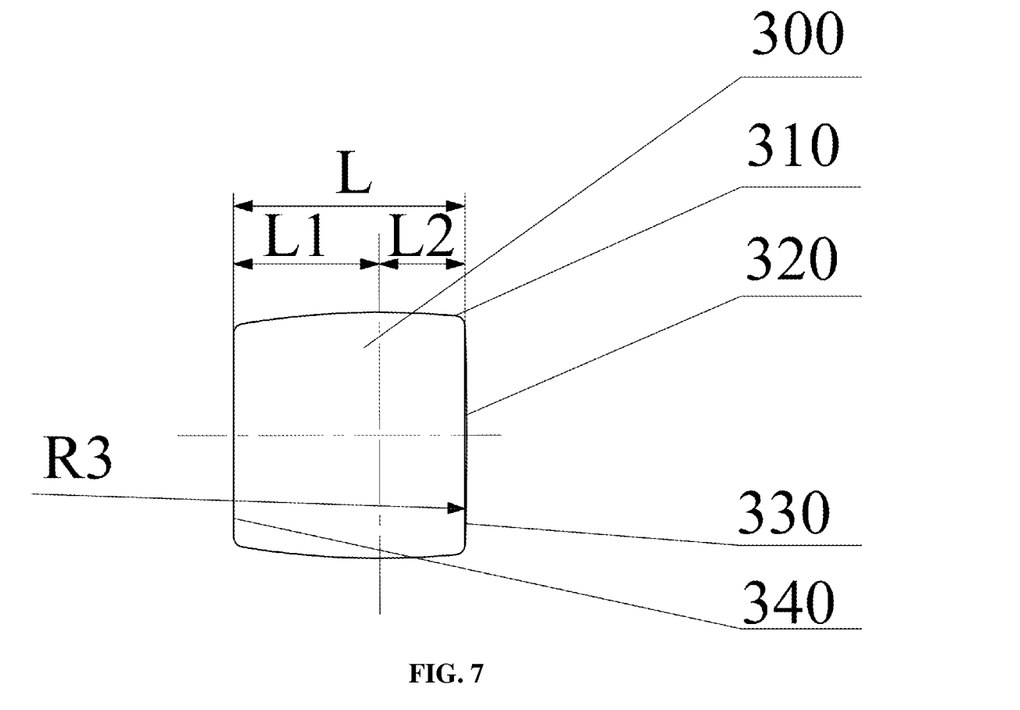
FIG. 7 is a schematic structural diagram of a roller of the second embodiment in the present disclosure.
Figure 8:
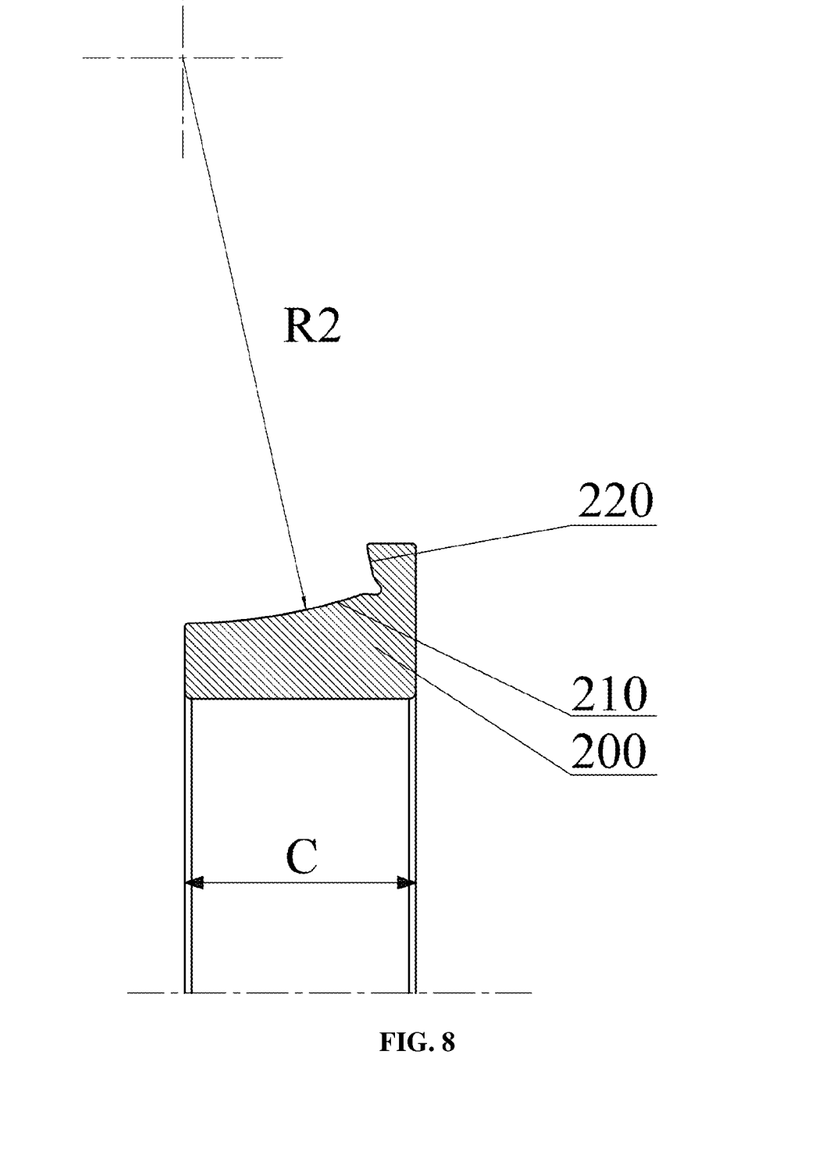
FIG. 8 is a schematic structural diagram of an inner ring of the second embodiment in the present disclosure.
Figure 9:
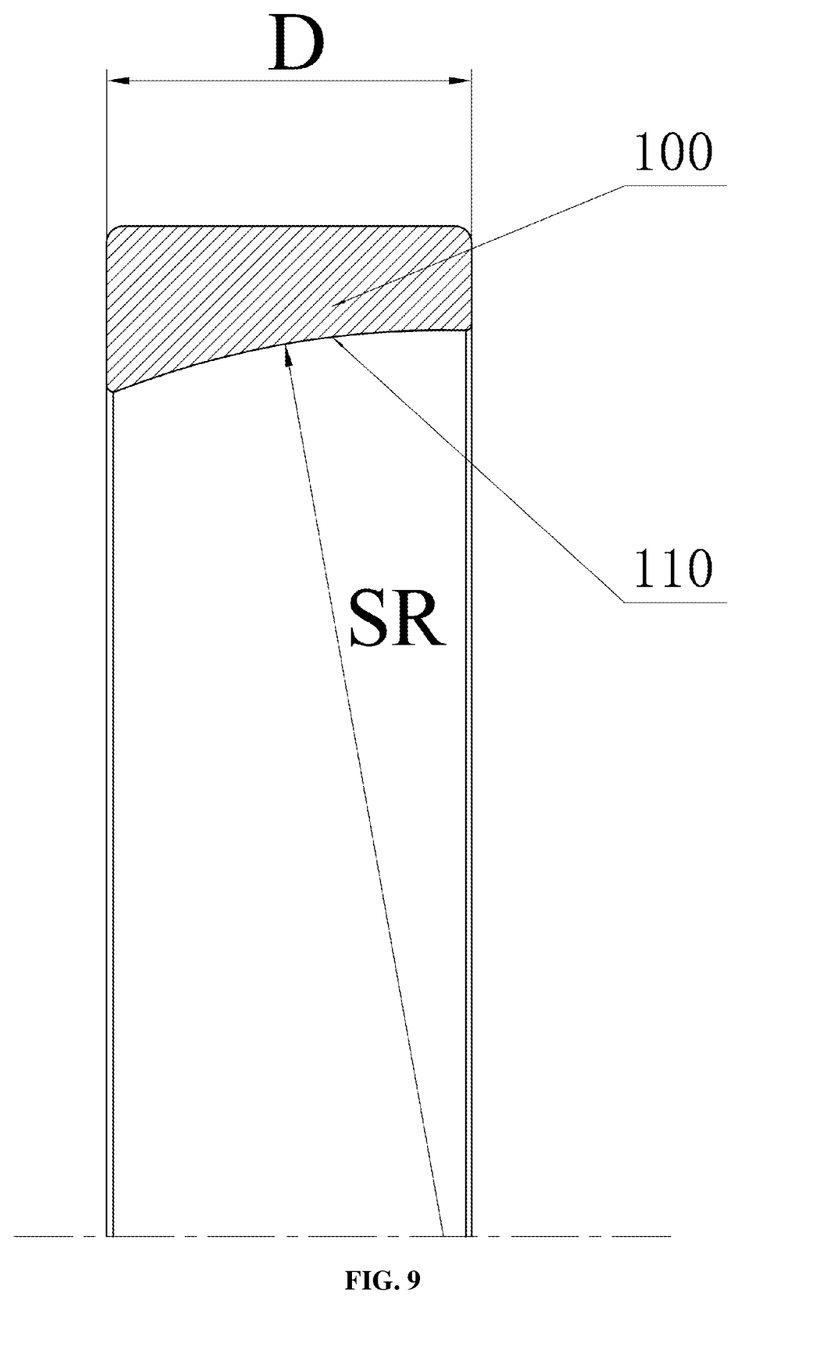
FIG. 9 is a schematic structural diagram of an outer ring in the present disclosure.
Figure 10:
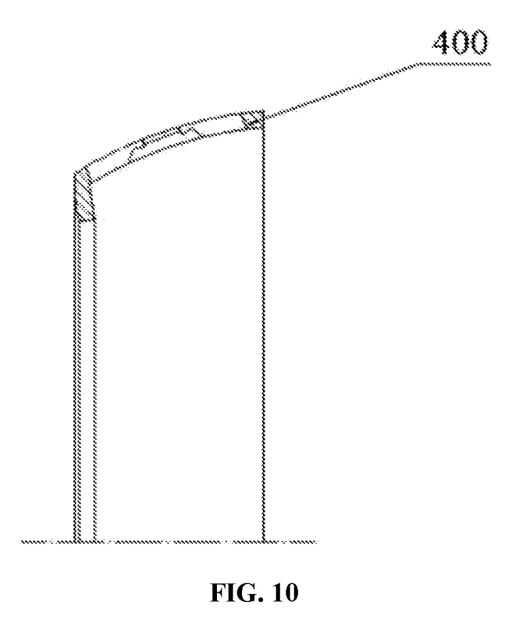
FIG. 10 is a schematic structural diagram of a cage in the present disclosure.

Referring to FIG. 7, according to a third possible example of the second embodiment, a surface where the axial second end of each roller 300 is located is an outer spherical surface with a radius R3, so as to reduce the friction between the axial second end of each roller 300 and the shoulder, and a spherical center of the outer spherical surface is located on the axis of each roller 300.

Specific examples are used for illustration of the principles and implementations of the present disclosure. The description of the above-mentioned embodiments is made only to help understanding the method and the core concepts of the present disclosure. Meanwhile, persons skilled in the art can make various modifications in terms of specific embodiments and ranges of application in accordance with the teachings of the present disclosure. In conclusion, the content of this specification shall not be construed as a limitation to the present disclosure.

What is claimed is:

1. An angular contact self-aligning roller bearing, comprising rollers, an inner ring, a cage and an outer ring, the inner ring, the cage and the outer ring being coaxially mounted, the cage being mounted between the inner ring and the outer ring, the cage being provided with pockets for the rollers to be mounted in, the inner ring being provided with an inner raceway in rolling contact with the rollers, and the outer ring being provided with an outer raceway in rolling contact with the rollers, wherein the outer raceway is an inner spherical surface, a spherical center of the inner spherical surface is located on an axis of the outer ring and deviates from a central point of the outer ring; the rollers are in a single row, a working surface of each roller is an externally convex surface, which is formed by rotation of a first circular arc as a generatrix around an axis of said each roller as a rotation axis; the inner raceway is an internally concave surface, which is formed by rotation of a second circular arc as a generatrix around an axis of the inner ring as a rotation axis; a nominal contact angle of the outer raceway measured from a radial axis of the bearing is defined as $\alpha$, a nominal contact angle of the inner raceway measured from the radial axis of the bearing is defined as $\beta$, $0°<\alpha<45°$, and $0°<\beta<45°$; and a radius of the inner spherical surface is defined as SR, a radius of the first circular arc is defined as R1, a radius of the second circular arc is defined as R2, and $0.97SR \leq R1<SR$, $0.97R2 \leq R1<R2$;

wherein an axial length of each roller is defined as L, an axial distance between a circle center of the first circular arc and an axial first end of said each roller is defined as L1, an axial distance between the circle center of the first circular arc and an axial second end of said each roller is defined as L2, and L1>L/2>L2; $\beta<\alpha$; a shoulder is arranged on the inner ring, and constrains and contacts with the axial second end of said each roller, so as to balance a resultant force of the forces applied to the rollers by the inner raceway and the outer raceway.

2. The angular contact self-aligning roller bearing according to claim 1, wherein the inner ring is provided with a first end surface and a second end surface in an axial direction of the angular contact self-aligning roller bearing, and the outer ring is provided with a third end surface and a fourth end surface in the axial direction; the first end surface and the third end surface are coplanar, and the second end surface and the fourth end surface are coplanar.

3. The angular contact self-aligning roller bearing according to claim 1, wherein the inner ring is provided with a first end surface and a second end surface in an axial direction of the angular contact self-aligning roller bearing, and the outer ring is provided with a third end surface and a fourth end surface in the axial direction; the first end surface and the third end surface are coplanar, and the second end surface and the fourth end surface are not coplanar.

4. The angular contact self-aligning roller bearing according to claim 1, wherein the inner ring is provided with a first end surface and a second end surface, and the outer ring is provided with a third end surface and a fourth end surface;

the first end surface and the third end surface are coplanar, and the second end surface and the fourth end surface are coplanar.

5. The angular contact self-aligning roller bearing according to claim 1, wherein the inner ring is provided with a first end surface and a second end surface, and the outer ring is provided with a third end surface and a fourth end surface; the first end surface and the third end surface are coplanar, and the second end surface and the fourth end surface are not coplanar.

6. The angular contact self-aligning roller bearing according to claim 1, wherein a surface where the axial second end of said each roller is located is an outer spherical surface with a radius R3, and a spherical center of the outer spherical surface is located on the axis of said each roller.

7. The angular contact self-aligning roller bearing according to claim 1, wherein $\alpha \leq 30°$, $\beta \leq 30°$.

8. The angular contact self-aligning roller bearing according to claim 1, wherein SR=R2.

* * * * *